Aug. 25, 1936.  J. T. ROTH  2,051,965
COUPLING
Original Filed Oct. 9, 1934
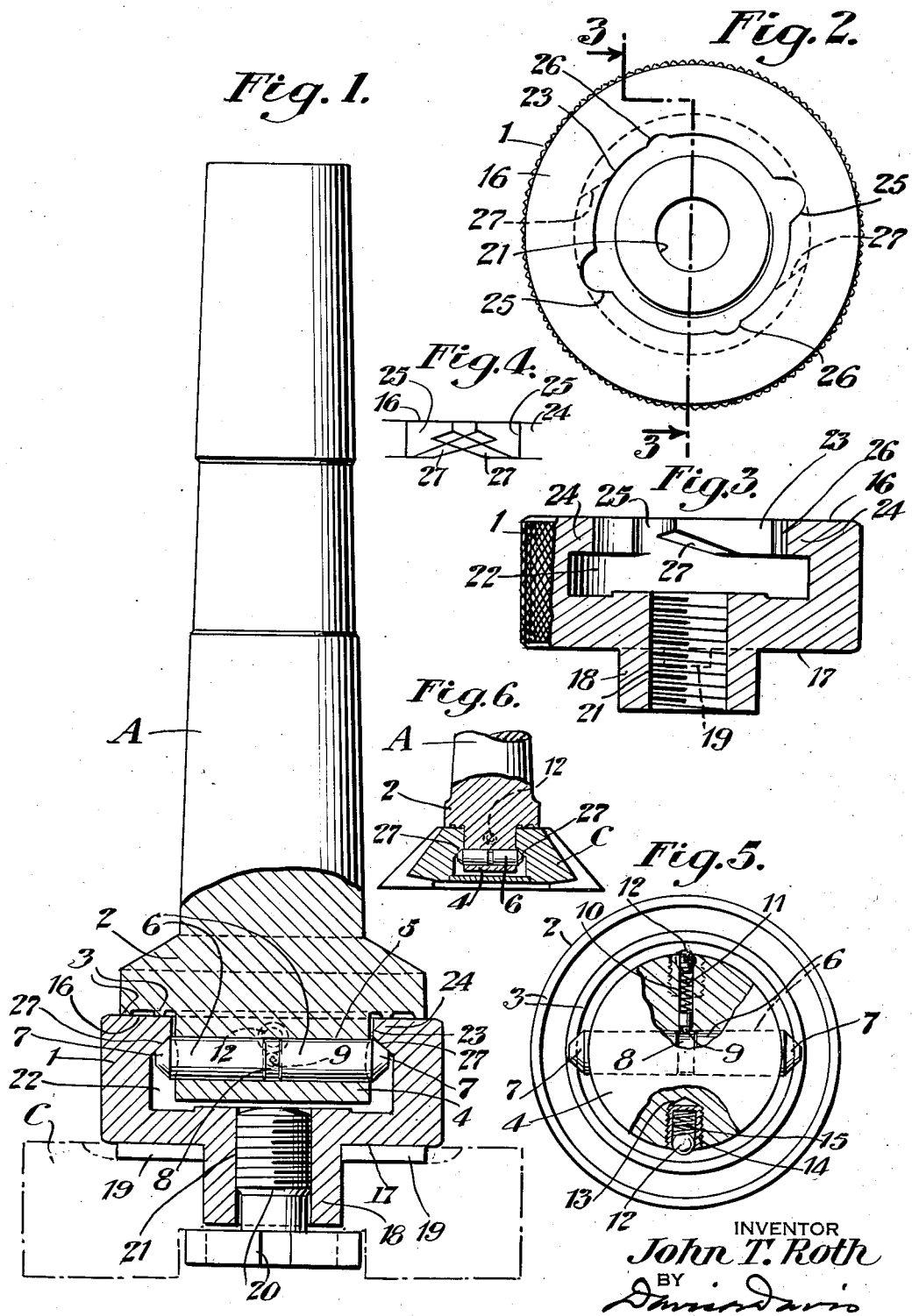
INVENTOR
John T. Roth
BY
ATTORNEYS Patented Aug. 25, 1936

2,051,965

UNITED STATES PATENT OFFICE 2,051,965

COUPLING

John T. Roth, Bellerose, N. Y.

Application October 9, 1934, Serial No. 747,522
Renewed January 3, 1936

12 Claims. (Cl. 287—53)

This invention relates to improvements in a coupling of the pin-and-bayonet-slot type wherein coupling projections diametrically disposed on one member are engageable with locking shoulders on another member to couple said members by rotation of one member on the other. More particularly the invention relates to an improved means for coupling a rotary tool to an arbor or chuck.

An important object of the invention is to provide a coupling of said type designed to render it self-compensating or equalizing to ensure accurate and positive bearing contact of the diametrically disposed coupling projections with both of the locking shoulders simultaneously in order to hold one of the coupled members accurately trued on the other member.

Another important object of the invention is to provide a satisfactory embodiment of said improved coupling in a driving connection between a machine tool and an arbor or chuck, for the purpose of holding a tool such as a milling cutter, for example, true upon the arbor for high-precision cutting, and for the purpose also of facilitating the attachment and detachment of the tool and the arcuate replacement of one tool with another of a different size or grade.

Other objects of the invention will appear hereinafter.

In the drawing, Fig. 1 is a view partly in section and partly in elevation, of an arbor, cutter and coupling assembly embodying the invention;

Fig. 2 a top plan view of one member alone of said assembly forming an element of the coupling and a mounting for the cutter;

Fig. 3 a section on the line 3—3 of Fig. 2;

Fig. 4 a diagrammatic view showing the locking shoulder surfaces of the coupling in lateral projection;

Fig. 5 a lower end view of the arbor, partly in section, with the coupling pin mounted therein; and Fig. 6 a view similar to Fig. 1, on a reduced scale, and showing the improved coupling designed for coupling the cutter directly to the arbor.

While in the present disclosure the invention is embodied in a driving connection between an arbor and a rotary tool, it may be employed satisfactorily in other connections.

In the assembly shown in Fig. 1, A is the arbor and C the milling cutter, the latter represented by dot-and-dash lines. The cutter is connected to the arbor through the medium of an adapter member 1. Part of the coupling structure is borne by said member and a cooperating part is borne by the arbor. The adapter enables a greater number of cutters of different size or of different grade to be connected to the arbor, as will be explained hereinafter.

The arbor has the usual tapered shank to fit the taper-reamed hole in the spindle of a milling machine, not shown. At its larger end the arbor is formed to provide a coupling head for connection to the adapter 1. Said head includes a disk-like integral enlargement 2 on the arbor affording a squaring abutment for the adapter. The actual abutment is preferably formed by several narrow concentric annular ribs 3 on the under face of said enlargement. The crests of the ribs are flat and disposed in a plane precisely at a right angle to the axis of the arbor. Its ribbed form enables the abutment to be wiped clean more easily, for full, accurate engagement of the adapter therewith. A cylindrical end portion 4 of the arbor projects axially, centrally of the abutment, and has a diametrical bore 5 disposed precisely at a right angle to the arbor axis.

A coupling pin 6 is fitted in said bore 5 for endwise sliding and for rotation. The end portions 7 of the pin protrude and taper outward. They are frusto-conical and have a smooth finish. At a central point in its length the pin has a peripheral groove 8 of slight depth, and a small stop element 9 borne by the arbor has a pointed end projecting into said groove to limit endwise shift of the pin and prevent it from coming out of the bore accidentally when the adapter 1 is off the arbor. Said stop 9 is in the form of a plunger fitted in a small bore 10 disposed at a right angle to the bore 5. A compression spring 11 bearing against the stop and against a threaded plug in the outer end of bore 10 urges the stop inward. The spring will yield to permit forcible insertion and withdrawal of the pin. At points spaced approximately ninety degrees around the arbor from the bore 5, there are two bearing balls 12 protruding slightly from the periphery of the end portion 4 of the arbor for engagement with the adapter, as will appear hereinafter. The balls are held in sockets 13 in the arbor by screw-threaded thimbles 14, and springs 15 in said thimbles urge the balls outward.

The adapter 1 has a circular disk-like body knurled or milled at its periphery for manually rotating the adapter to couple and uncouple it. One face of the adapter body is flat and smooth and at a right angle to the axis of the adapter to serve as an abutment 16 for accurate bearing on the abutment ribs 3 of the arbor head. At its opposite face 17 the adapter body has a centered cylindrical projection 18 affording a mount for the cutter C. Around said projection the face 17 is smooth and flat and parallel to the opposite face 16. Keys 19 integral with the adapter body extend from the projection 18 radially outward across the face 17 and are adapted to fit in keyways in the opposed face of the cutter for driving connection of the adapter with the cutter. The bore of the cutter should closely fit the mount 18, and the cutter is detachably held on the mount by a headed screw 20. The head of the screw bears against a countersunk outer face of the cutter, and the shank is screwed into an axial bore 21 in the adapter.

The body of the adapter defines a substantially circular interior space 22 and at its abutment face the adapter has an entrance aperture 23 opening into said space. Said aperture is circular except for interruption by several notches therearound, and its wall is cylindrical. It is co-axial with the periphery of the cutter-supporting projection 18 of the adapter. The diameter of the aperture is materially less than that of the interior space 22, so that there is defined an annular locking flange 24 for engagement with the coupling pin 6. At points diametrically located the aperture 23 has two notches 25 in said flange, of a size to freely receive the ends of the coupling pin. Midway between the notches 25 the aperture has two smaller notches 26 in the flange, of a size to freely receive the protruding portions of the bearing balls 12 carried by the arbor.

At its under face the flange 24 has two helicoidal locking shoulder surfaces 27 diametrically arranged and formed for coupling and driving contact with the tapered ends of the coupling pin. Longitudinally each of said locking surfaces leads from one of the notches 25 and extends on a helix, or substantially so, around the axis of the adapter. From the notch it slopes inward, away from the abutment face 16 of the adapter. It also slopes transversely from the aperture, away from said abutment face. Preferably its transverse slope radially of the adapter is forty-five degrees, and the slope of the tapered ends of the coupling pin corresponds. The two surfaces 27 are equidistant from the abutment face 16 and they lead from the notches 25 in the same direction around the adapter axis, that is, clockwise in the present instance, as viewed in Fig. 2. As viewed in lateral projection on a diameter they slope in opposite directions, as indicated diagrammatically in Fig. 4.

In applying the adapter, with a mounted cutter, to the arbor, the end of the arbor enters the aperture 23 of the adapter and the ends of the coupling pin enter the notches 25 to a point below the high edge of the locking surfaces 27. This disposes the protruding portions of the bearing balls 12 in the notches 26. Then the adapter is rotated counterclockwise to ride the tapered ends of the pin along the helicoidal locking surfaces 25. The longitudinal inclination of the latter causes the adapter to be drawn up against the abutment ribs 3. At the same time the transverse inclination of said surfaces causes a camming action on the pin to shift the latter in either direction, as required, to obtain good bearing contact of the tapered ends of the pin with both of the surfaces 25 simultaneously and thus ensure full contact of the bearing face 16 of the adapter with the abutment ribs 3 all around the axis of the arbor. This accurately trues or squares the cutter for high-precision work. If the adapter and mounted cutter are not fully trued before the operation of the tool they will become so automatically when the cutting begins. The driving force is transmitted to the adapter by bearing contact of the ends of the coupling pin on the inclined surfaces 27, and since the reaction of the cutting resistance is reverse to the direction of the driving force, said re-action will force the pin ends inward along the inclined surfaces to draw and hold the abutment face 16 tight against the abutment ribs 3.

The coupling automatically equalizes at opposite sides of the axis by shift of the pin and compensates for any slight inaccuracy there may be in the locking surfaces or in the pin. Full, equalized bearing contact between the floating pin and the locking surfaces is obtained by mere relative rotation between the adapter and the arbor reversely to the cutting rotation, and the adapter and cutter are thereby locked true while cutting. The degree of longitudinal inclination of the surfaces 27 is such as to prevent chatter in the coupling and at the same time permit the adapter to be manually rotated to uncouple it.

Said reverse rotation which couples and trues the adapter to the arbor also causes the bearing balls 12 to ride out of the notches 26 and onto the cylindrical surface of the adapter aperture 25. Preferably there is provided a slight clearance between the end of the arbor and the wall of the aperture, and the balls 12, urged by their springs 15, take up the clearance and frictionally hold the adapter against slacking back after it has been rotated to coupling position on the arbor.

When it is required to employ a plurality of cutters in succession the cutters may be mounted in advance upon separate adapters. Then each tool change may be made very quickly by uncoupling one adapter and tool from the arbor and coupling on another prepared adapter and tool. The improved coupling greatly facilitates the attachment and detachment of the adapter, and the self-equalizing or compensating feature of the coupling ensures accurate squaring of the cutter without the necessity of nice adjustment and care on the part of the machinist. A mere straight axial push-on movement of the adapter and a slight turn thereof opposite to the direction of cutting rotation are all the manual adjustment required to couple the adapter to the arbor.

The provision of the adapter and coupling also increases the range of cutters that a given arbor will accommodate. An arbor of standard type will accommodate only a definite range of cutters of different sizes. If it is required to employ cutters outside of that range it is necessary to replace the arbor with another having a cutter mount of the proper size. A given adapter will also accommodate a certain range of cutters. When a cutter outside of that range is required it is only necessary to remove the adapter and substitute another adapter interchangeable with the first one on the arbor and with a cutter mount of the required size.

In Fig. 6 there is shown an embodiment of the improved coupling which dispenses with the adapter and provides for direct coupling of the cutter C to the arbor. Here the cutter is centrally hollowed out to receive the end portion 4 of the arbor and the coupling pin, and is integrally formed with the inclined locking shoulders 27. Otherwise the coupling structure is similar to that previously described and its principle is the same.

What I claim is:

1. A coupling between two members one of which is rotatable relatively to the other for coupling, comprising a coupling pin borne by one of said members to shift endwise thereon in either direction transversely of the axis of said coupling rotation and having outwardly tapering opposite end portions, a pair of locking shoulders borne by the other of said members, spaced around said axis and disposed transversely thereof and each extending longitudinally substantially on a helix around the axis and sloping transversely, and mutually engageable coupling stop abutments borne by said members and disposed transversely of said axis and extending therearound, said locking shoulders being respectively engageable lockably with the tapered end portions of the pin and adapted by reason of their slope to cam the pin endwise in either direction, upon said coupling rotation, for locking engagement of the end portions of the pin with both shoulders to hold said abutments in full mutual engagement around the axis.

2. A coupling between two members one of which is rotatable relatively to the other for coupling, comprising a coupling pin borne by one of said members to shift endwise thereon in either direction transversely of the axis of said coupling rotation, a pair of locking shoulders borne by the other of said members, spaced around said axis and disposed transversely thereof and each extending longitudinally substantially on a helix around the axis and sloping transversely, and mutually engageable coupling stop abutments borne by said members and disposed transversely of said axis and extending therearound, said locking shoulders being respectively engageable lockably with the end portions of the pin and adapted by reason of their slope to cam the pin endwise in either direction upon said coupling rotation, for locking engagement of the end portions of the pin with both shoulders to hold said abutments in accurate mutual engagement.

3. A coupling between two members one of which is rotatable relatively to the other for coupling, comprising a coupling pin borne by one of said members to shift endwise thereon in either direction transversely of the axis of said coupling rotation, a pair of locking shoulders borne by the other of said members and lockably engageable with opposite end portions of said pin, and mutually engageable coupling stop abutments on said members disposed transversely of said axis, said locking shoulders and the end portions of the pin being cooperable upon said coupling rotation to shift the pin endwise in either direction to effect locking engagement of the end portions of the pin with both shoulders to hold said abutments in full mutual engagement.

4. A coupling between two members one of which is rotatable relatively to the other for coupling, comprising a coupling pin borne by one of said members to shift endwise thereon in either direction transversely of the axis of said coupling rotation, and a pair of locking shoulders borne by the other of said members and lockably engageable respectively with opposite end portions of said pin, said locking shoulders and the end portions of the pin being cooperable upon said coupling rotation to shift the pin endwise in either direction to effect locking engagement of the end portions of the pin with both shoulders.

5. In combination, a rotatable driving member having an abutment extending around its axis of rotation and disposed transversely thereof and a central portion projecting axially beyond said abutment and provided with a diametrical bore, a coupling pin fitted in said bore to shift endwise and having outwardly tapered opposite end portions protruding from opposite sides of said projecting central portion of the driving member, a driven member rotatable relatively to the driving member on its said axis for coupling thereto and having an abutment to engage said abutment on the driving member around the axis of the latter, a pair of locking shoulders borne by said driven member, facing away from said abutment of the latter and each extending longitudinally substantially on a helix around said axis and sloping transversely outward away from said abutments and lockably engageable respectively with the tapered end portions of the pins, said shoulders being adapted by reason of their slope to cam the coupling pin endwise in either direction, upon said coupling rotation, to effect engagement of the tapered end portions of the pin with both shoulders to hold said abutments in full mutual engagement around the axis.

6. A coupling between two members one of which is rotatable relatively to the other for coupling, comprising coupling means borne by one of said members to shift transversely of the axis of said coupling rotation, and means operable by said coupling rotation to shift said coupling means in either direction to effect equalized coupling connection between said members at opposite sides of the axis of coupling rotation.

7. A coupling between two members one of which is rotatable relatively to the other for coupling, comprising mutually engageable coupling stop abutments borne by said members and disposed transversely of the axis of coupling rotation and extending around the axis, coupling means borne by one of said members to shift transversely of the axis of coupling rotation, and cam means operable by said coupling rotation to shift said coupling means in either direction transversely of said axis to effect equalized coupling connection between said members at opposite sides of the axis to hold said abutments in full mutual engagement around the axis.

8. In combination, a rotary driving member, a driven member, coupling means borne by one of said members to shift transversely of the axis of the driving member, one of said members being rotatable relatively to the other on said axis for coupling the members, mutually engageable coupling stop abutments borne by said members and disposed transversely of said axis and extending therearound, cam means operable by said coupling rotation to shift said coupling means in either direction transversely of the axis to effect equalized coupling and driving connection between the driving and driven members at opposite sides of the axis and hold said abutments in mutual engagement around the axis, and means borne by the driven member to mount a rotary tool thereon co-axially with the driving member.

9. In combination, a rotary driving member, a rotary tool, and a driving coupling between said driving member and tool comprising a coupling pin borne by the driving member to shift transversely of the axis of said member, mutually engageable tool-squaring and coupling stop abutments borne by the driving member and the tool and disposed transversely of the axis of the driving member and tool, and locking shoulders borne by the tool and lockably engageable respectively with opposite end portions of the pin, the tool being rotatable relatively to the driving member for coupling engagement of said shoulders with the pin, and the shoulders having a cam form to cam the pin endwise in either direction by said coupling rotation to effect locking engagement of its end portions with both shoulders to hold said abutments in full mutual engagement.

10. In combination, a rotary driving member, a driven member, coupling means borne by one of said members to shift transversely of the axis of the driving member, one of said members being rotatable relatively to the other on said axis for coupling the members, mutually engageable coupling stop abutments borne by said members and disposed transversely of said axis and extending therearound, cam means operable by said coupling rotation to shift said coupling means in either direction transversely of the axis to effect equalized coupling and driving connection between the driving and driven members at opposite sides of the axis and hold said abutments in mutual engagement around the axis, and compressible and resilient means borne by one of said members and engageable with the other member to yieldably resist uncoupling shift between the members.

11. In combination, a rotary driving member, a follower member rotatable by said driving member coaxially therewith, one of said members having a bore transverse to its axis of rotation, a coupling pin fitted in said bore for endwise shift in either direction transverse to said axis, one of said members being rotatable relatively to the other about said axis for coupling the members, and cam means operable by said coupling rotation to shift said coupling pin longitudinally in either direction to effect equalized coupling and driving connection between the driving member and the follower member at opposite sides of their axis of rotation.

12. In combination, a rotary driving member, a follower member rotatable by said driving member coaxially therewith, one of said members having a bore transverse to its axis of rotation, a coupling pin fitted in said bore for endwise shift in either direction transverse to said axis, one of said members being rotatable relatively to the other about said axis for coupling the members, means operable by said coupling rotation to shift said coupling pin longitudinally in either direction to effect equalized coupling and driving connection between the driving member and the follower member at opposite sides of their axis of rotation, and means to resist uncoupling rotation of one of said members relatively to the other.

JOHN T. ROTH.